US010177656B2

(12) United States Patent
Cao

(10) Patent No.: US 10,177,656 B2
(45) Date of Patent: Jan. 8, 2019

(54) CONTROL CIRCUIT FOR DC-DC CONVERTER THAT INCLUDES DIFFERENTIAL AMPLIFIER AND OSCILLATOR TO FAST REACH DESIRED OUTPUT VOLTAGE

(71) Applicant: Shenzhen China Star Optoelectronics Technology Co., Ltd., Shenzhen, Guangdong (CN)

(72) Inventor: Dan Cao, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 182 days.

(21) Appl. No.: 15/114,555

(22) PCT Filed: May 16, 2016

(86) PCT No.: PCT/CN2016/081221
§ 371 (c)(1),
(2) Date: Jul. 27, 2016

(87) PCT Pub. No.: WO2017/156840
PCT Pub. Date: Sep. 21, 2017

(65) Prior Publication Data
US 2018/0109185 A1   Apr. 19, 2018

(30) Foreign Application Priority Data

Mar. 18, 2016   (CN) .......................... 2016 1 0155979

(51) Int. Cl.
*H02M 3/158* (2006.01)
*H02M 3/157* (2006.01)
(Continued)

(52) U.S. Cl.
CPC .............. *H02M 3/158* (2013.01); *G09G 3/36* (2013.01); *G09G 3/3696* (2013.01);
(Continued)

(58) Field of Classification Search
CPC ..................................................... H02M 3/158
See application file for complete search history.

(56) References Cited

U.S. PATENT DOCUMENTS 6,366,070 B1 *   4/2002   Cooke ................. H02M 3/1588
                                                             323/222
9,160,229 B2    10/2015   Fan
(Continued)

FOREIGN PATENT DOCUMENTS

CN        101027829 A       8/2007
CN        101478234 A       7/2009
(Continued)

*Primary Examiner* — Jue Zhang
*Assistant Examiner* — Trinh Q Dang
(74) *Attorney, Agent, or Firm* — Andrew C. Cheng

(57) ABSTRACT

The control circuit for a DC-DC converter includes a differential amplifier and an oscillator, and also a multiplier and a voltage divider circuit. The multiplier has a first input terminal receiving a feedback voltage derived from an output voltage of the DC-DC converter through the voltage divider circuit, a second input terminal receiving a parameter compensation value, and an output terminal connected to a first input terminal of the differential amplifier. A second input terminal of the differential amplifier receives a reference voltage. The differential amplifier provides a differential signal to the oscillator. The oscillator is connected to a switch driver module of the DC-DC converter so as to provide an output signal whose frequency is proportional to the differential signal. The control circuit is able to effectively reduce response time, achieve fast transient transition, and significant enhance system reliability.

13 Claims, 2 Drawing Sheets

(51) Int. Cl.
 *G09G 3/36* (2006.01)
 *H02M 3/156* (2006.01)
(52) U.S. Cl.
 CPC ........... *H02M 3/156* (2013.01); *H02M 3/157* (2013.01); *G09G 2310/0275* (2013.01)

(56) References Cited

U.S. PATENT DOCUMENTS

2006/0261795 A1   11/2006  Steele
2011/0157141 A1*  6/2011   Woo ..................... H02M 3/156
                                                    345/212

FOREIGN PATENT DOCUMENTS

| CN | 101944858 A | 1/2011 |
| CN | 101997411 A | 3/2011 |
| CN | 103051187 A | 4/2013 |
| CN | 104993701 A | 10/2015 |
| CN | 105322786 A | 2/2016 |
| JP | 2001086758 A | 3/2001 |

\* cited by examiner

CONTROL CIRCUIT FOR DC-DC CONVERTER THAT INCLUDES DIFFERENTIAL AMPLIFIER AND OSCILLATOR TO FAST REACH DESIRED OUTPUT VOLTAGE

BACKGROUND OF THE INVENTION

1. Field of the Invention

The present disclosure relates to liquid crystal display driver circuit technologies, and in particular to a control circuit for DC-DC converters.

2. The Related Arts

Most DC-DC converters are current-controlled ones where the duty cycle of their output pulses is controlled by a pulse-width comparator. The pulse width comparator compares a current sample signal and an output signal from a differential amplifier. Currently, current-controlled DC-DC converter samples both the output voltage signal and the current signal on the inductor. An operational transducer receives a feedback voltage from the output voltage and a reference voltage, and output a processing result to the inverting terminal of the comparator. The outputs from a current detection circuit and a triangular-wave generator are summed and input to the non-inverting terminal of the comparator. A driver signal is output from the comparator for controlling the ON/OFF statuses of a power tube. Due to that the operational transducer requires loop compensation, an additional phase delay is introduced between the input and output, leading to long response time, slow transient, and compromised system reliability.

SUMMARY OF THE INVENTION

An objective of the present disclosure is to provide a novel control circuit for a DC-DC converter so as to obviate the shortcomings of the conventional current-controlled DC-DC converters due to an additional stage of phase delay, such as extended response time, slow transient, and inferior system reliability.

To achieve the objective, the present disclosure teaches a control circuit for a DC-DC converter, including a differential amplifier and an oscillator. A first input terminal of the differential amplifier receives a feedback voltage from the DC-DC converter, and a second input terminal of the differential amplifier receives a reference voltage. An output terminal of the differential amplifier is connected to an input terminal of the oscillator so as to provide a differential signal to the oscillator. An output terminal of the oscillator is connected to a switch driver module of the DC-DC converter so as to provide an output signal whose frequency is proportional to the differential signal to the switch driver module for controlling charging and discharging intervals of the switch driver module.

The control circuit further includes a multiplier. The first input terminal of the differential amplifier receives the feedback voltage through the multiplier. A first input terminal of the multiplier receives the feedback voltage, a second input terminal of the multiplier receives a parameter compensation value, and an output terminal of the multiplier is connected to the first input terminal of the differential amplifier.

The parameter compensation value is a compensation value to a desired voltage at the output terminal of the DC-DC converter and is obtained by a voltage compensation module in the DC-DC converter integrated circuit (IC). Different desired voltages at the DC-DC converter output terminal correspond to different parameter compensation values, and the parameter compensation value is inversely proportional to the desired voltage.

The parameter compensation value is less than 1.

The output signal from the oscillator has a frequency inversely proportional to the discharging interval of the switch driver module.

The switch driver module of the DC-DC converter is connected to the output terminal of the DC-DC converter through a storage module.

The control circuit further includes a voltage divider circuit. The feedback voltage is derived from an output voltage at the output terminal of the DC-DC converter through the voltage divider circuit.

The reference voltage is greater than the feedback voltage.

The voltage divider circuit includes a first resistor and a second resistor. At least one of the first and second resistors is a variable resistor.

The switch driver module includes a driver, a first switch controlling charging to the storage module of the DC-DC converter, and a second switch controlling discharging to the storage module. The driver opens/closes the first and second switches according to the output signal of the oscillator. The open/close statuses of the first and second switches are reversed.

The first input terminal of the differential amplifier is the inverting terminal, and the second input terminal is the non-inverting terminal.

The output signal from the oscillator is a square-wave signal.

The present disclosure teaches a control circuit for a DC-DC converter. Through the configuration of a differential amplifier and an oscillator, an output voltage of the DC-DC converter reaches and maintains a desired voltage. To use a different desired voltage, a multiplier is configured to receive a feedback voltage and multiply the feedback voltage with a parameter compensation value. The differential amplifier provides a differential signal according to the output of the multiplier and a reference voltage. The differential signal determines the frequency of the oscillator's output signal. The frequency in turn determines the periodic operation status of a switch driver module of the DC-DC converter. As such, the output voltage of the DC-DC converter approaches and then maintains the adjusted desired voltage. The DC-DC converter employing the control circuit of the present disclosure is able to effectively reduce response time, achieve fast transient transition, and significant enhance system reliability.

BRIEF DESCRIPTION OF THE DRAWINGS

To make the technical solution of the embodiments according to the present disclosure, a brief description of the drawings that are necessary for the illustration of the embodiments will be given as follows. Apparently, the drawings described below show only example embodiments of the present disclosure and for those having ordinary skills in the art, other drawings may be easily obtained from these drawings without paying any creative effort. In the drawings.

DETAILED DESCRIPTION OF THE PREFERRED EMBODIMENTS

Figure 1:
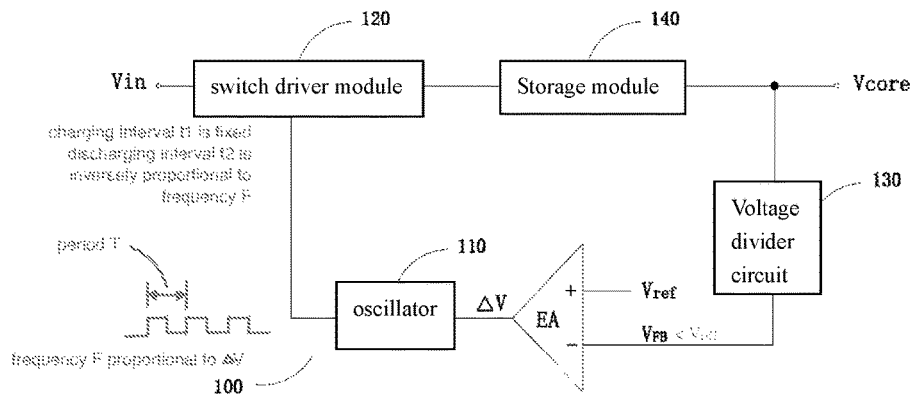
FIG. 1 is a schematic diagram showing a DC-DC converter control circuit according to the present disclosure.

FIG. 1 is a schematic diagram showing a control circuit for a DC-DC converter according to the present disclosure.

As illustrated, the control circuit 100 includes a differential amplifier EA and an oscillator 110.

The inverting terminal of the differential amplifier EA receives a feedback voltage $V_{FB}$ derived from an output voltage Vcore from the DC-DC converter's output terminal. The non-inverting terminal of the differential amplifier EA receives a reference voltage $V_{ref}$ which is less than the DC-DC converter output voltage Vcore. A differential signal $\Delta V$ at the output terminal of differential amplifier EA is derived from the comparison value between the reference voltage $V_{ref}$ and the feedback voltage $V_{FB}$. The reference voltage $V_{ref}$ is greater than the feedback voltage $V_{FB}$.

The input terminal of the oscillator 110 receives the differential signal $\Delta V$ and an output signal from the output terminal of the oscillator 110 is passed to an switch driver module 120 of the DC-DC converter so as to control charging and discharging intervals of the switch driver module 120, which in turn adjust the output voltage Vcore from the output terminal of the DC-DC converter until it reaches and maintains a desired voltage.

The output signal frequency of the oscillator 110 is inversely proportional to the discharging interval of the switch driver module 120.

The output signal frequency of the oscillator 110 is proportional to the differential signal $\Delta V$ in that a greater differential signal $\Delta V$ corresponds to a higher output signal frequency, and a smaller differential signal $\Delta V$ corresponds to a lower output signal frequency.

The control circuit 100 further includes a voltage divider circuit 130 where the feedback voltage $V_{FB}$ is derived from the DC-DC converter output voltage Vcore through the voltage divider circuit 130.

The input terminal of the switch driver module 120 receives a DC voltage Vin. The switch driver module 120 is connected to the output terminal of the DC-DC converter through a storage module 140.

The operation of the control circuit 100 is as follows.

The switch driver module 120 conducts charging and discharging alternately and periodically. Within each cycle, the charging interval $t_1$ is fixed whereas the discharging interval $t_2$ is varied according to the oscillator 110's output signal frequency. Specifically, the discharging interval $t_2$ is inversely proportional to the oscillator 110's output signal frequency. In other words, the higher oscillator 110's output signal frequency is, the shorter the discharging interval $t_2$ is, resulting in a reduced total discharging time.

When the DC-DC converter output voltage Vcore is less than the desired voltage, the feedback voltage $V_{FB}$ is smaller and as such the differential signal $\Delta V$ from the differential amplifier EA according to the feedback voltage $V_{FB}$ and the reference voltage $V_{ref}$ is greater. The oscillator 110's output signal therefore has a greater frequency, leading to a shorter discharging interval $t_2$. Due to the reduced total discharging time, the DC-DC converter output voltage Vcore increases, approaching the desired voltage.

Similarly, when the DC-DC converter output voltage Vcore is greater than the desired voltage, the feedback voltage $V_{FB}$ is larger and as such the differential signal $\Delta V$ from the differential amplifier EA according to the feedback voltage $V_{FB}$ and the reference voltage $V_{ref}$ is smaller. The oscillator 110's output signal therefore has a smaller frequency, leading to a longer discharging interval $t_2$. Due to the extended total discharging time, the DC-DC converter output voltage Vcore decreases, approaching the desired voltage. The above process is repeated periodically until the DC-DC converter output voltage Vcore reaches and maintains the desired voltage.

Figure 2:
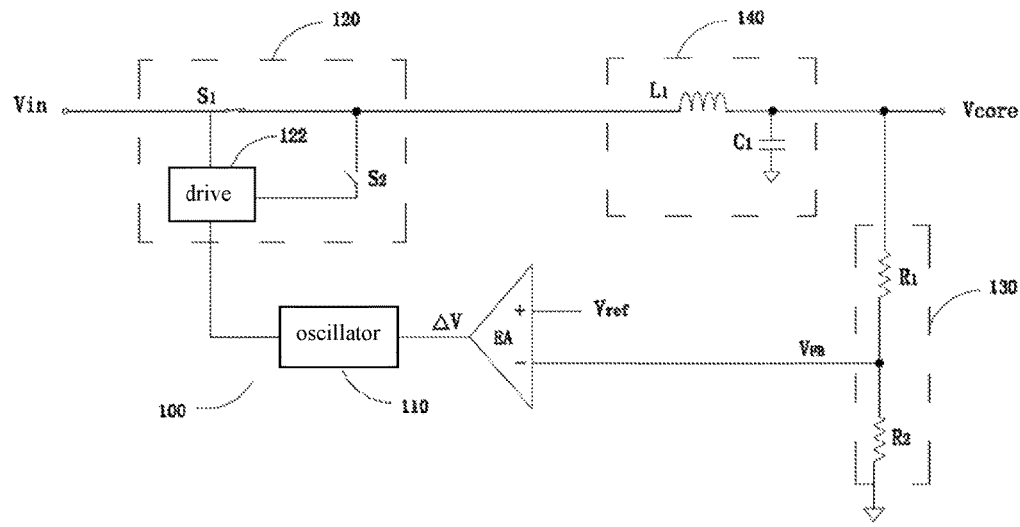
FIG. 2 is a schematic diagram showing a DC-DC converter control circuit according to an embodiment of the present disclosure.

FIG. 2 is a schematic diagram showing a DC-DC converter control circuit according to an embodiment of the present disclosure.

As illustrated, the voltage divider circuit 130 includes a first resistor $R_1$ and a second resistor $R_2$ series-connected between the DC-DC converter output terminal and ground. The junction between the first and second resistors $R_1$ and $R_2$ is connected to the inverting terminal of the differential amplifier EA.

Alternatively, at least one of the first and second resistors $R_1$ and $R_2$ is a variable resistor. The reference voltage $V_{ref}$ being greater than the feedback voltage $V_{FB}$ is achieved through adjusting the variable resistor.

The switch driver module 120 includes a driver 122, a first switch $S_1$ for, when closed, charging the storage module 140, and a second switch $S_2$ for, when closed, discharging the storage module 140. The output terminal of the oscillator 110 is connected to the driver 122 which is in turn connected to the storage module 140 through the first and second switches $S_1$ and $S_2$. The storage module 140 is connected to the DC-DC converter output terminal.

The driver 122 opens and closes the first and second switches $S_1$ and $S_2$ according to the oscillator 110's output signal. The open/close statuses of the first and second switches $S_1$ and $S_2$ are reversed. The input and output terminals' phases are revered.

The oscillator 110's output signal may be a square-wave signal.

The oscillator 110 may be a voltage-controlled oscillator.

The storage module 140 includes an inductor $L_1$ and a capacitor $C_1$. The inductor L1 has an end connected to the first and second switches $S_1$ and $S_2$ and another end connected to the DC-DC converter output terminal. The capacitor $C_1$ is connected between the DC-DC converter output terminal and ground.

The first and second switches $S_1$ and $S_2$ may be field effect transistors (FETs), such as a first FET $Q_1$ and a second FET $Q_2$. The driver 122 is connected to the DC-DC converter output terminal through the first and second FETs $Q_1$ and $Q_2$. The driver 122 is connected to the gates of the first and second FETs $Q_1$ and $Q_2$. The source of the first FET $Q_1$ receives the input DC voltage Vin. The drains of the first and second FETs $Q_1$ and $Q_2$ are connected to the inductor $L_1$. The source of the second FET $Q_2$ is connected to ground.

The driver 122 receives the square-wave signal from the oscillator 110's output terminal, and opens/closes the first and second FETs $Q_1$ and $Q_2$. The first FET $Q_1$ may be an insulating-gate enhanced mode P-channel FET, and the second FET $Q_2$ may be insulating-gate depleted mode N-channel FET.

Figure 3:
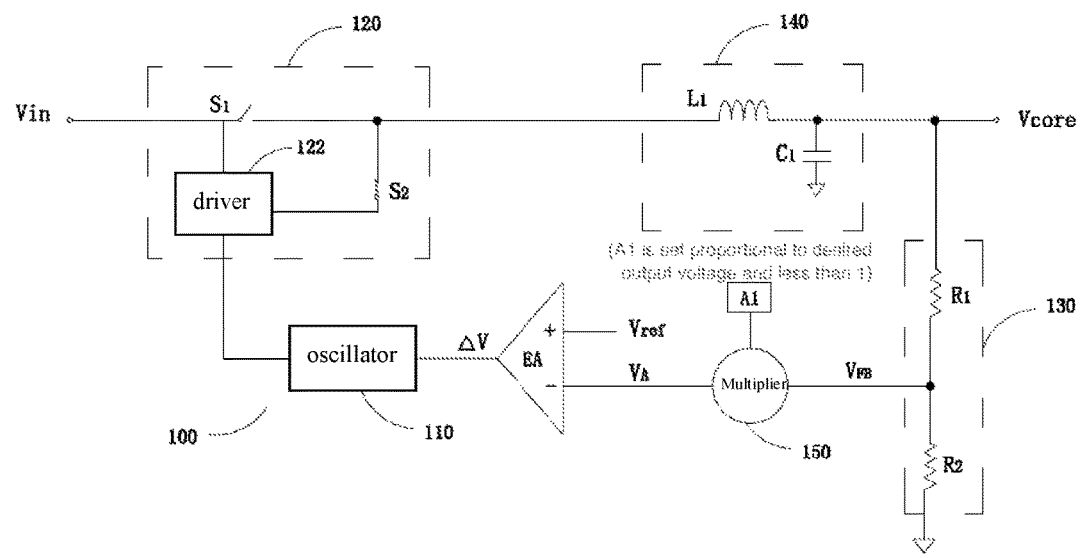
FIG. 3 is a schematic diagram showing a DC-DC converter control circuit according to another embodiment of the present disclosure.

FIG. 3 is a schematic diagram showing a DC-DC converter control circuit according to another embodiment of the present disclosure.

As illustrated, the present embodiment has an additional multiplier 150, compared to the previous embodiment. The inverting terminal of the differential amplifier EA receives the feedback voltage $V_{FB}$ through the multiplier 150. Specifically, the first terminal of the multiplier 150 receives the feedback voltage $V_{FB}$, and the second terminal of the multiplier 150 receives a parameter compensation value A1. An output voltage $V_A$ of the multiplier 150 is derived from the product of the parameter compensation value A1 and the feedback voltage $V_{FB}$. The multiplier 150 is for achieving outputs of different desired voltages.

The parameter compensation value A1 is a compensation value for the desired voltage at the DC-DC converter output terminal, and is obtained by a voltage compensation module in the DC-DC converter integrated circuit (IC). The parameter compensation value A1 is less than 1.

The parameter compensation value A1 may be different depending on the different desired voltage at the DC-DC converter output terminal. By adjusting the parameter compensation value A1, the desired voltage at the DC-DC converter output terminal is appropriately compensated. The parameter compensation value A1 is inversely proportional to the desired voltage at the DC-DC converter output terminal. For example, if a first desired voltage at the DC-DC converter output terminal corresponds to a parameter compensation value a (a<1) and a second desired voltage is greater than the first desired voltage, then a parameter compensation value $a_1$ ($a_1$<1) corresponds to the second desired voltage is less than a. On the other hand, if the second desired voltage is less than the first desired voltage, then $a_1$ is greater than a.

The inverting terminal of the differential amplifier EA receives an output voltage $V_A$ from the output terminal of the multiplier 150. The non-inverting terminal of the differential amplifier EA receives the reference voltage $V_{ref}$. The differential signal ΔV at the output terminal of the differential amplifier EA is derived from the comparison value between the reference voltage $V_{ref}$ and the multiplier 150 output voltage $V_A$.

The multiplier 150 output voltage $V_A$, the feedback voltage $V_{FB}$, the reference voltage $V_{ref}$, and the DC-DC converter output voltage Vcore satisfy the following relation: $V_A$, $V_{FB}$<$V_{ref}$<Vcore. Therefore the differential signal ΔV output from the differential amplifier EA is positive.

The input terminal of the oscillator 110 receives the differential signal ΔV. The output signal from the oscillator 110 is sent to the switch driver module 120 of the DC-DC converter. The oscillator 110's output signal frequency is proportional to the differential signal ΔV. That is, the greater the differential signal ΔV is, the higher the oscillator output signal frequency is, and the smaller the differential signal ΔV is, the lower the oscillator output signal frequency is.

According to the present disclosure, a DC-DC converter employing the control circuit of the present disclosure is able to effectively reduce response time, achieve fast transient transition, and significant enhance system reliability.

Embodiments of the present disclosure have been described, but not intending to impose any unduly constraint to the appended claims. Any modification of equivalent structure or equivalent process made according to the disclosure and drawings of the present disclosure, or any application thereof, directly or indirectly, to other related fields of technique, is considered encompassed in the scope of protection defined by the clams of the present disclosure.

What is claimed is:

1. A control circuit for a DC-DC converter, comprising a differential amplifier and an oscillator, wherein
   a first input terminal of the differential amplifier receives a feedback voltage from the DC-DC converter, and a second input terminal of the differential amplifier receives a reference voltage;
   an output terminal of the differential amplifier is connected to an input terminal of the oscillator so as to provide a differential signal to the oscillator; and
   an output terminal of the oscillator is connected to a switch driver module of the DC-DC converter so as to provide the output signal whose frequency is proportional to the differential signal to the switch driver module for controlling charging and discharging intervals of the switch driver module;
   further comprising a multiplier wherein the first input terminal of the differential amplifier receives the feedback voltage through the multiplier; a first input terminal of the multiplier receives the feedback voltage; a second input terminal of the multiplier receives a parameter compensation value; an output terminal of the multiplier is connected to the first input terminal of the differential amplifier.

2. The control circuit as claimed in claim 1, further comprising a voltage divider circuit wherein the feedback voltage is derived from an output voltage at the output terminal of the DC-DC converter through the voltage divider circuit.

3. The control circuit as claimed in claim 1, further comprising a voltage divider circuit wherein the feedback voltage is derived from an output voltage at the output terminal of the DC-DC converter through the voltage divider circuit.

4. The control circuit as claimed in claim 1, wherein the parameter compensation value is a compensation value to a desired voltage at the output terminal of the DC-DC converter; and the parameter compensation value is inversely proportional to the desired voltage.

5. The control circuit as claimed in claim 1, wherein the switch driver module comprises a driver, a first switch controlling charging to a storage module of the DC-DC converter, and a second switch controlling discharging to the storage module; the driver opens/closes the first and second switches according to the output signal of the oscillator; and the open/close statuses of the first and second switches are reversed.

6. The control circuit as claimed in claim 1, wherein the frequency of the output signal from the oscillator is inversely proportional to the discharging interval of the switch driver module.

7. The control circuit as claimed in claim 1, wherein the output signal from the oscillator is a square-wave signal.

8. The control circuit as claimed in claim 1, wherein the switch driver module comprises a driver, a first switch controlling charging to a storage module of the DC-DC converter, and a second switch controlling discharging to the storage module; the driver opens/closes the first and second switches according to the output signal of the oscillator; and the open/close statuses of the first and second switches are reversed.

9. The control circuit as claimed in claim 1, wherein the frequency of the output signal from the oscillator is inversely proportional to the discharging interval of the switch driver module.

10. The control circuit as claimed in claim 1, wherein the output signal from the oscillator is a square-wave signal.

11. The control circuit as claimed in claim 2, wherein the reference voltage is greater than the feedback voltage.

12. The control circuit as claimed in claim 3, wherein the voltage divider circuit comprises a first resistor and a second resistor.

13. The control circuit as claimed in claim 4, wherein the parameter compensation value is less than 1.

* * * * *